US012781789B2

(12) United States Patent
Yen

(10) Patent No.: US 12,781,789 B2
(45) Date of Patent: Nov. 3, 2026

(54) SELF-LOCKING HOOK TO AVOID UNEXPECTED OPENING

(71) Applicant: Ying-Chuan Yen, Yuanlin City (TW)

(72) Inventor: Ying-Chuan Yen, Yuanlin City (TW)

( * ) Notice: Subject to any disclaimer, the term of this patent is extended or adjusted under 35 U.S.C. 154(b) by 207 days.

(21) Appl. No.: 18/643,150

(22) Filed: Apr. 23, 2024

(65) Prior Publication Data

US 2025/0237260 A1 Jul. 24, 2025

(30) Foreign Application Priority Data

Jan. 18, 2024 (CN) ......................... 202410078391.2
Jan. 18, 2024 (CN) ......................... 202420132115.5

(51) Int. Cl.
*F16B 45/02* (2006.01)
*F16B 45/00* (2006.01)

(52) U.S. Cl.
CPC .......... *F16B 45/024* (2021.05); *F16B 45/023* (2021.05); *F16B 45/008* (2021.05)

(58) Field of Classification Search
CPC .... F16B 45/024; F16B 45/023; F16B 45/008; F16B 45/026; F16B 45/027; F16B 45/028; F16B 45/029; F16B 45/036; F16B 45/045; F16B 45/049; A44C 5/2033; A44C 5/2038
See application file for complete search history.

(56) References Cited

U.S. PATENT DOCUMENTS 158,220 A * 12/1874 Reynolds .............. F16B 45/023 24/599.4
165,122 A * 6/1875 Reynolds .............. F16B 45/026 24/599.7
731,162 A * 6/1903 Carter .................... F16B 45/024 24/600.1
865,224 A * 9/1907 Applegate ............. F16B 45/026 24/599.7
932,673 A * 8/1909 Benjamin ............. F16B 45/049 24/600.8
1,682,617 A * 8/1928 Jensen ..................... E21B 19/04 24/600.1
4,458,393 A * 7/1984 Pogharian ............ A44C 5/2038 24/601.5
4,546,523 A * 10/1985 Bailey, Jr. ............. F16B 45/026 24/599.7

(Continued)

*Primary Examiner* — Jason W San
*Assistant Examiner* — Rowland Do
(74) *Attorney, Agent, or Firm* — Demian K. Jackson; Jackson IPG PLLC

(57) ABSTRACT

What is disclosed in the present invention is a self-locking hook to avoid unexpected opening. When a press-button is pressed down, a spring is compressed, a pressing arm and an axle pin are completely inserted into an insertion hole, at this point, the axle pin leaves a transverse clipping position and forms an openable state with a support arm, in which they can rotate along the curved slide rail in a mounting slot. An elastic arm is mounted inside the mounting slot and is pressed upon the bottom surface of the support arm to push a lock hook and maintain the locking state between a lock arm and a hook arm. The lock hook be rotated only when the press-button is pressed down. The present invention can avoid direct opening of the lock hook under a pressing force, thus preventing unexpected opening and loosening of the hook.

8 Claims, 5 Drawing Sheets

(56) References Cited

U.S. PATENT DOCUMENTS

| | | | | | |
|---|---|---|---|---|---|
| 4,712,279 | A * | 12/1987 | Hiraishi | F16B 45/027 24/599.4 |
| 5,018,254 | A * | 5/1991 | Brodin | F16B 45/027 24/601.5 |
| 5,398,389 | A * | 3/1995 | Terada | F16B 45/023 24/599.6 |
| 7,636,990 | B1 * | 12/2009 | Choate | F16B 45/026 24/600.1 |
| 9,032,594 | B1 * | 5/2015 | Mitchell | F16B 45/027 24/601.5 |
| 9,091,295 | B1 * | 7/2015 | Yang | F16B 45/028 |
| 10,995,791 | B1 * | 5/2021 | Chen | F16B 21/073 |
| 2011/0078881 | A1 * | 4/2011 | Carveth | F16B 45/026 24/599.6 |
| 2015/0033515 | A1 * | 2/2015 | Lai | F16B 45/024 24/601.5 |
| 2016/0208845 | A1 * | 7/2016 | Zivanovic | F16B 45/053 |

* cited by examiner

SELF-LOCKING HOOK TO AVOID UNEXPECTED OPENING

BACKGROUND OF INVENTION

1. Field of the Invention

The present invention relates generally to the technical field of metal accessories, and more particularly to a hook for fixing on Loops, Rings and other objects.

2. Description of Related Art

Hook are widely used in apparels, luggage cases, sport equipment, and pet products to attach Loops, Rings and other objects. In the current market, there are mainly two types of hooks: A. Bolt Snap Hook & B. Carabiner Hook. A. Bolt Snap Hook features a vertical bolt-latch on the opening gate of the hook, using the elasticity of a spring (compression spring) for closing the hook gate and could be directly pressed down to open the gate. B. Carabiner has a rotatable latch, the hook can be opened by pressing the latch down.

These two types of hooks are so widely used, but seldom people know they may cause unexpected opening/unlatching due to rotation offset or latch being pressed back by attached objects. For example, in the combination of a D-shape loop attached by a hook, when the D-shaped loop is tangled to squeeze the locking bolt of the hook, the bolt may be pushed backward, resulting in a unlatching/loosening risk. In order to overcome the unexpected unlatching, there are some lockable hooks being made. However, the existing lockable hooks have relatively complex structures, leading to inconvenient assembly and difficult operation.

To overcome such problems, this invention titled "A Self Locking Swivel Hook" submitted a technique to effectively solve the above problems, reducing the chances of unexpected unlatching and enhance the case of use and safety of the hook.

SUMMARY OF THE INVENTION

The technical problems to be solved by the present invention are defects of the conventional techniques. A self-locking hook to avoid unexpected opening with a simple structure, more rational design, and higher safety that is less liable to unexpected opening and unlocking is provided.

To solve the above problems, the present invention adopts the following technical scheme: a self-locking hook to avoid unexpected opening, including a hook base and a lock hook, the lock hook is assembled with the hook base to form a relatively rotatable structure through a rotation shaft; the head part of the hook base is provided with an opening, a hook arm is formed on one side of the opening; a mounting slot is located in the hook base, a Γ-shaped transverse clipping position with a curved slide rail is disposed on both sides inside the mounting slot; the lock hook is an L-shaped bending structure, comprising a lock arm and a support arm, the support arm is embedded in the mounting slot of the hook base, the lock arm protrudes out toward the opening of the hook base, characterized in that: the structure includes a press-button and an elastic arm, the front end of the press-button is extended with a pressing arm, said pressing arm is located inside the mounting slot, while the press-button extends out of the hook base from the rear slot on the rear end of the mounting slot; an insertion hole matching the pressing arm and extending inward is configured along the rear end of the support arm, a spring is disposed inside the insertion hole, the spring is pressed upon the front end of the pressing arm, when the press-button is pressed down, the spring is compressed, the pressing arm is completely inserted into the insertion hole together with the axle pin, at this point, the axle pin leaves the transverse clipping position and forms an openable state with the support arm, in which they can rotate along the curved slide rail inside the mounting slot; the elastic arm is mounted inside the mounting slot and is pressed upon the bottom surface of the support arm to push the lock hook to maintain the locked state between the lock arm and the hook arm.

Further, an axle pin is disposed across the two sides of the pressing arm, accordingly, a long opening structure is respectively disposed on the two sides of the insertion hole to match the axle pin, and the axle pin is caught inside the opening structure. In addition, the axle pin protrudes on both sides of the pressing arm, and cooperates with the Γ-shaped transverse clipping positions and curved slide rails on both sides of the mounting slot inside the hook, forming a self-clip structure that can be opened by a two-stage action of pressing and rotating.

Further, the entire lock hook is an L-shaped structure. The bent part of the lock hook is disposed with a shaft hole. A rotation shaft is put through the shaft hole and connected to the fixing hole on the hook base.

Further, the elastic arm is connected to a decor cap. The decor cap is embedded into the slot mouth on the front end of the mounting slot to cover the mounting slot from the front end. The elastic arm extends upward in an arched form from the lower side of the support arm to press upon the bottom surface of the support arm. In the same way, the elastic arm may be replaced by a metal reed or a spring to provide the source of elastic force against the support arm.

Further, a positioning hole is disposed near the front edge on the lock base, a clip is disposed on both sides of the decor cap. By clipping the clip into the positioning hole, the decor cap is assembled and fixed with the hook base.

Further, the head part of the hook arm is disposed with a hook head. The head part of the hook head is disposed with a lock head. The lock head and the hook head form an inverted T-shaped structure. The end part of the lock arm is disposed with a lock groove in a shape to match the hook head and the lock head. When the lock arm and the hook arm are engaged, the hook head and the lock head are caught inside the lock groove. A closed (non-unilateral force-bearing) force-bearing structure is formed with the hook arm, which can effectively share the stress on the hook arm and provide the hook body with greater tensile force bearing capacity.

Further, said self-locking hook to avoid unexpected opening is characterized by: The hook base, the lock hook and the press-button can be made of metallic or plastic materials; the pressing arm and the press-button can be an integral or separate structure; the decor cap and the elastic arm are an integral structure, and a separate structure of decor cap and elastic arm can be used as required, which is made of metallic or plastic materials.

Further, the tail end of the hook base is disposed with a connecting head. The connecting head and the hook base are formed in an integral structure. A swivel connecting loop is connected to the connecting head. The connecting loop is locked on the connecting head through a clamping ring.

The present invention adopts a press-button in combination with an elastic arm to control the lock hook. The press-button is positioned opposite the opening of the hook. Only when the press-button is pressed and pushed downward can the lock hook be rotated to unlock the hook. When the press-button is released, the lock hook springs back automatically, and the axle pin springs back to the ┌-shaped transverse clipping positions, implementing the self-locking function. This two-stage action can effectively avoid unexpected unlatching/loosening when the lock arm and the D-shaped loop are tangled, and avoid the lock hook being opened under a direct pressing force, so as to eliminate the safety risks of unexpected opening and unlocking of the hook. Once the press-button is pressed down, the lock hook can be opened by moving the press-button or by directly pushing the lock hook inward. The operation is very convenient. In addition, in case of any emergency, as the operations of press unlocking and opening the lock arm are the continuation of the same action, the requirement for quick unlocking can be met, not like the conventional lockable hooks, which takes extra time for unlocking as it must be unlocked before it is opened.

Figure 1:
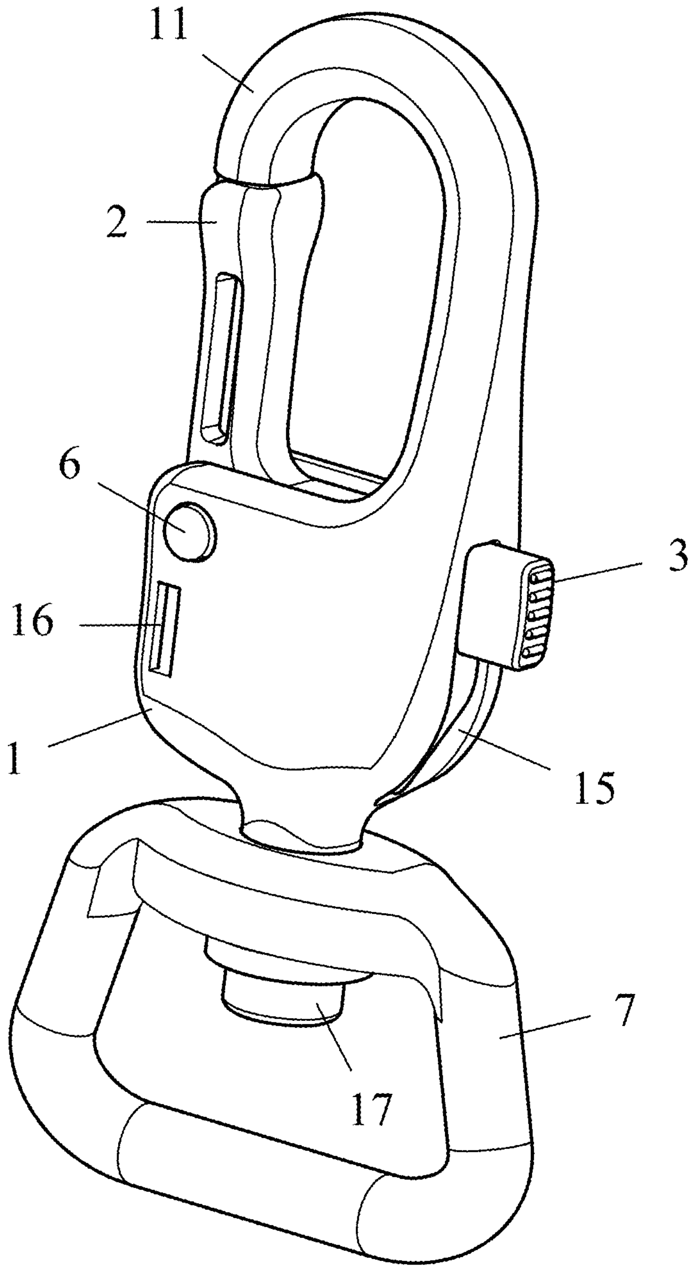
FIG. 1 is an overall structural view of the present invention.

1 hook base
11 hook arm
12 hook head
13 lock head
14 mounting slot
141 transverse clipping position
142 curved slide rail
15 rear slot
16 positioning hole
17 connecting head
2 lock hook
21 lock arm
22 support arm
23 shaft hole
24 lock groove
25 insertion hole
3 press-button
31 pressing arm
32 axle pin
4 spring,
5 decor cap
51 elastic arm,
6 is rotation shaft, and
7 is connecting loop,
a is the action path.

DETAILED DESCRIPTION OF THE INVENTION

Figure 2:
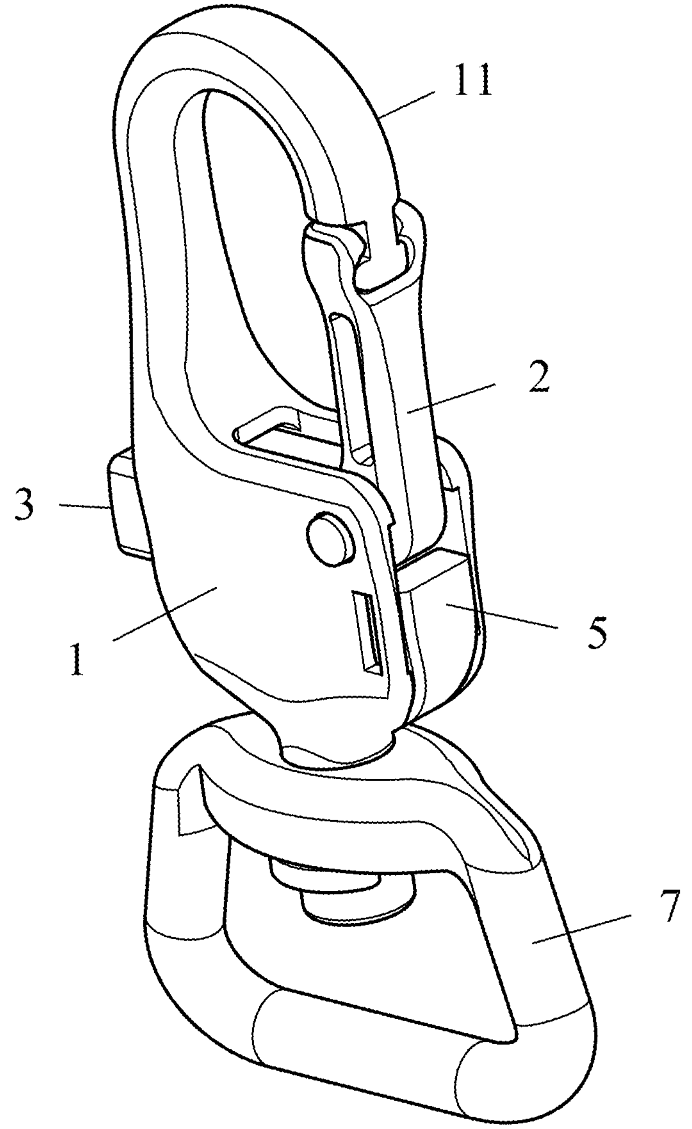
FIG. 2 is an overall structural view of the present invention from another viewing angle.
Figure 3:
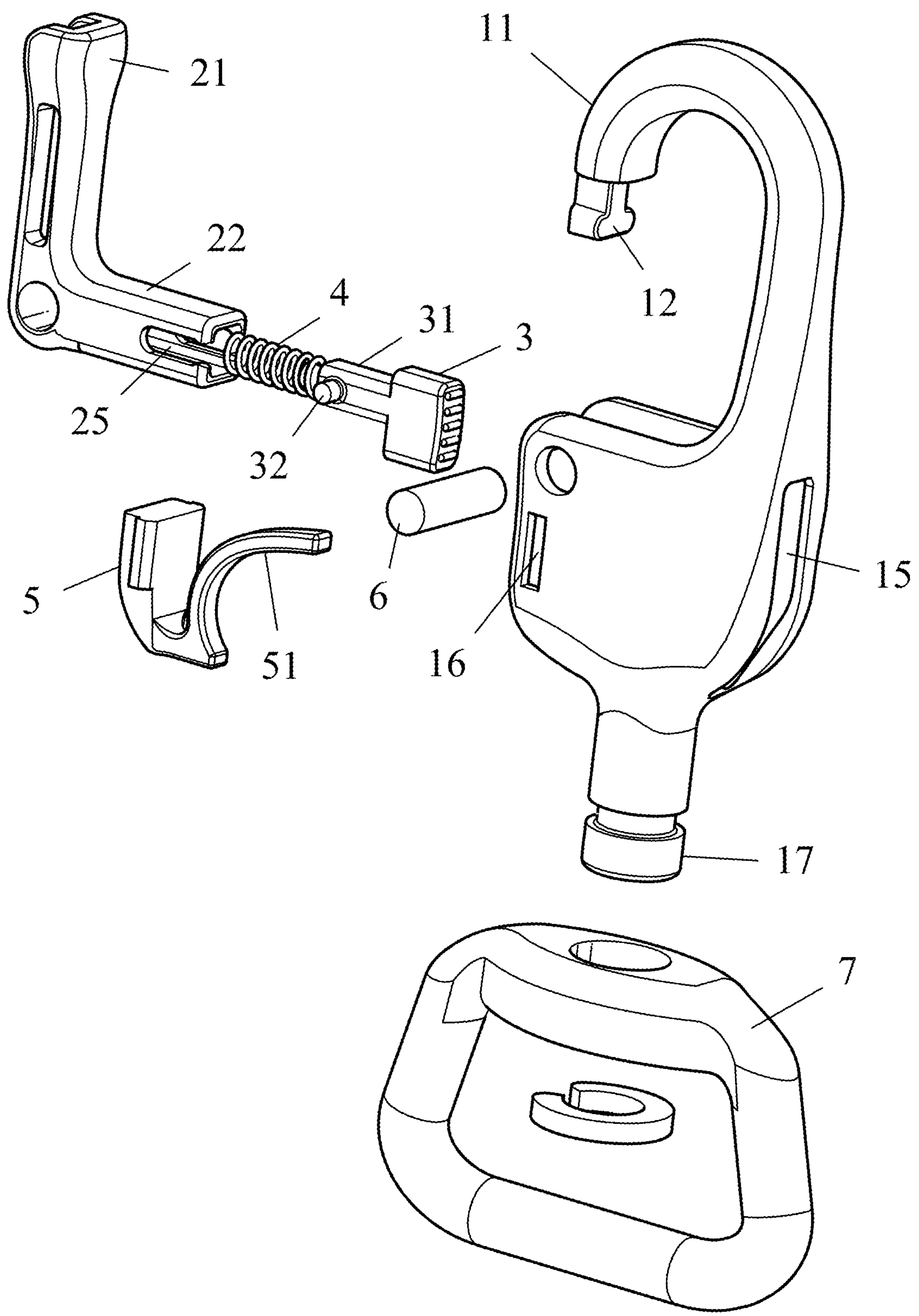
FIG. 3 is an exploded structural view of the present invention.
Figure 4:
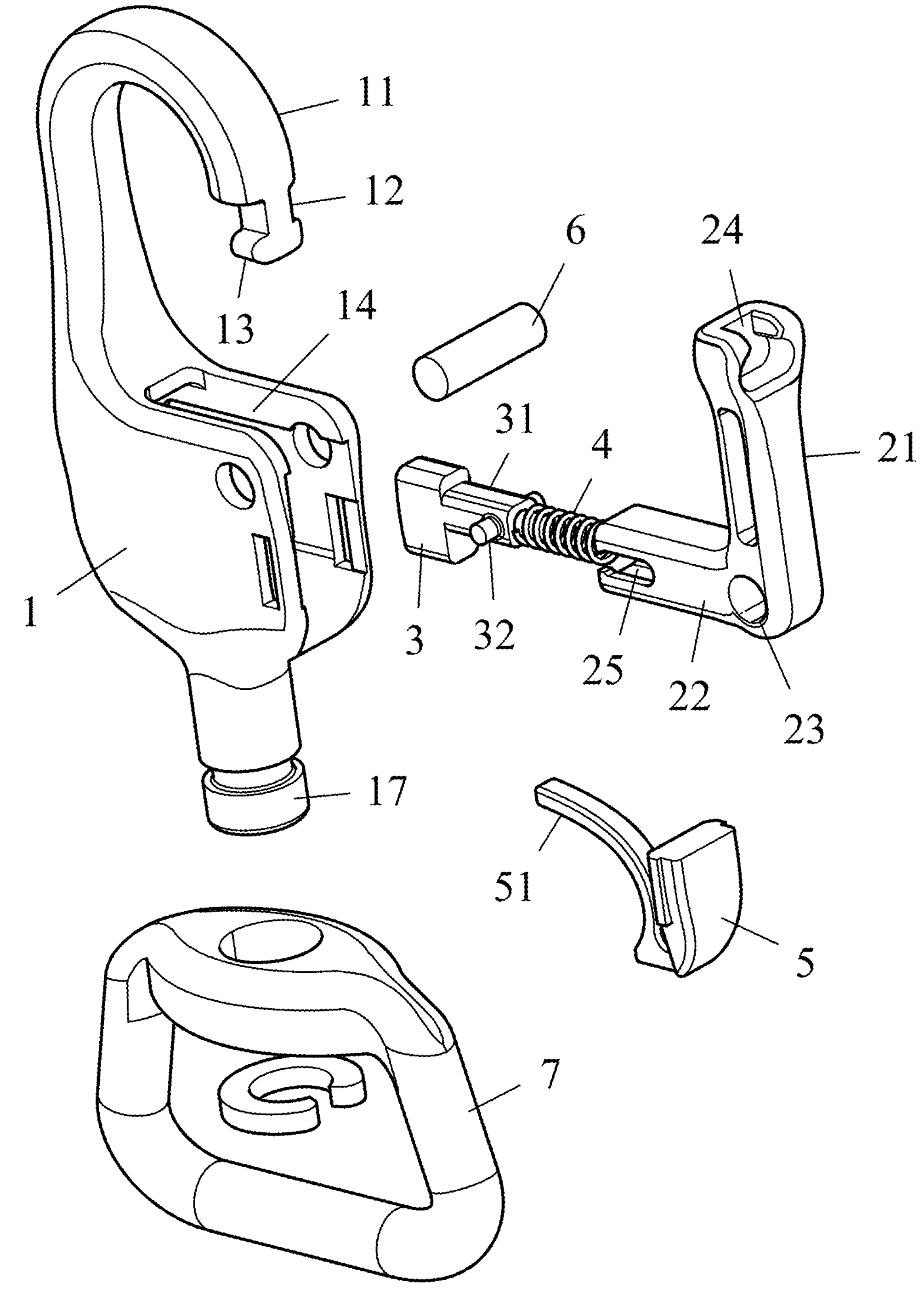
FIG. 4 is an exploded structural view of the present invention from another viewing angle.
Figure 5:
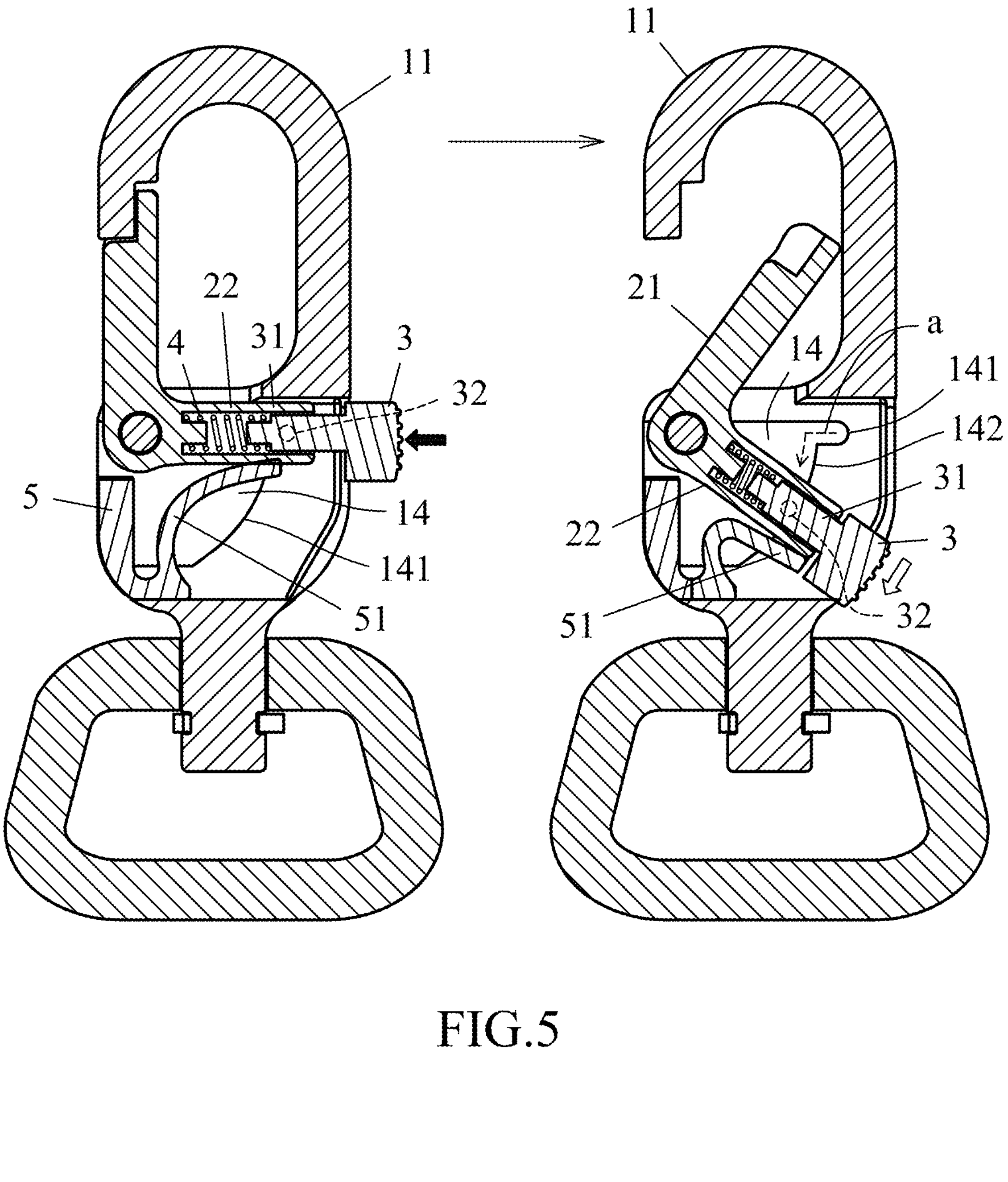
FIG. 5 is a sectional view of the present invention from the locked state to the unlocked state.

In the present invention, as depicted in FIGS. 1 to 5, the self-locking hook to avoid unexpected opening comprises a hook base 1 and a lock hook 2. Said lock hook 2 is assembled with the hook base 1 to form a relatively rotational structure through a rotation shaft 6. The head part of the hook base 1 is disposed with an opening. One side of the opening is formed with a hook arm 11. The lock hook 2 is a bent structure including a lock arm 21 and a support arm 22. The support arm 22 is embedded inside the mounting slot 14 of the hook base 1. The lock arm 21 extends out toward the opening of the hook base 1. The structure also includes a press-button 3 and an elastic arm 51. The front end of the press-button 3 is extended with a pressing arm 31. The pressing arm 31 is located inside the mounting slot 14. The press-button 3 extends out of the hook base 1 from the rear slot 15 on the rear end of the mounting slot 14, so that it can be pressed down. An insertion hole 25 matching the pressing arm 31 and extending inward is configured along the rear end of the support arm 22. A spring 4 is disposed inside the insertion hole 25. The spring 4 is pressed upon the front end of the pressing arm 31. When the press-button 3 is pressed down (see solid short arrow in FIG. 5), the spring 4 is compressed, the pressing arm 31 is completely inserted into the insertion hole 25, meanwhile, the axle pin 32 leaves the transverse clipping position 141 inside the mounting slot 14, so that the support arm 22 forms a linked rotational combination. The lock hook 2 can be pushed by the pressing arm 31 (see hollow arrow in FIG. 5) to rotate along the internal curved slide rail 142, so that the lock arm 21 rotates inward to open the hook. The elastic arm 51 is mounted inside the mounting slot 14 and pressed upon the bottom surface of the support arm 22 to push the lock hook 2 to maintain the locked state between the lock arm 21 and the hook arm 11. Once the press-button 3 is released, the press-button 3 and the axle pin 32 are squeezed by the elastic arm 51, and return to the transverse clipping position 141 along internal curved slide rail 142, at this point, under the effect of the spring 4, the press-button 3 will bounce back out of the rear slot 15, and the pressing arm 31 will basically withdraw from the insertion hole 25, the axle pin 32 is restored and abuts on the transverse clipping position 141, so that complete linkage is failed. Under the force of the elastic arm 51, the lock hook 2 is pushed to rotate and reset, so that the lock arm 21 and the hook arm 11 are locked. In this way, the structure can realize self-locking.

An axle pin 32 is disposed across the two sides of the pressing arm 31, and a long opening structure matching the axle pin 32 is disposed on both sides of the insertion hole 25. The axle pin 32 is caught inside the opening structure. The axle pin 32 protrudes on both sides of the pressing arm 31, and cooperates with the ┌-shaped transverse clipping position 141 and curved slide rail 142 on both sides inside the mounting slot 14, forming a clip structure that can be opened by the two-stage action of pressing and rotation, as the action path a of axle pin 32 (dotted arrow) in FIG. 5, when the press-button 3 is released, the lock hook 2 bounces back automatically in the opposite direction of path a, and the axle pin 32 springs back to the ┌-shaped transverse clipping position 141, implementing the self-locking function.

The entire lock hook 2 is a L-shaped structure. The bent part of the lock hook 2 is disposed with a shaft hole 23. The rotation shaft 6 is put through the shaft hole 23 and connected to the fixing hole on the hook base 1.

The elastic arm 51 is connected with a decor cap 5. The decor cap 5 is embedded inside the slot mouth on the front end of the mounting slot 14 to cover the mounting slot from the front end 14. The elastic arm 51 extends in an arched form from the lower side of the support arm 22 and is pressed upon the bottom surface of the support arm 22.

A positioning hole 16 is disposed near the front edge on the hook base 1, a clip is disposed on both sides of the decor cap 5. By clipping the clip into the positioning hole 16, the decor cap 5 is assembled and fixed with the hook base 1. The assembly is convenient and can be performed without screws for fixing.

The head part of the hook arm 11 is disposed with a hook head 12. The head part of the hook head 12 is disposed with a lock head 13. The lock head 13 and the hook head 12 form an inverted T-shaped structure. A lock groove 24 having a shape matching the hook head 12 and the lock head 13 is disposed on the end part of the lock arm 21. When the lock arm 21 and the hook arm 11 are engaged, the hook head 12 and the lock head 13 are caught inside the lock groove 24 to avoid swing and ensure stable locking. A closed (non-unilateral force-bearing) force-bearing structure is formed with the hook arm 11, which can effectively share the stress on the hook arm 11 and provide the hook body with greater tensile force bearing capacity.

The hook base 1, the lock hook 2, and the press-button 3 are made of metallic or plastic materials. The pressing arm 31 and the press-button 3 are formed in an integral structure or a separate structure. The decor cap 5 and the elastic arm 51 are formed in an integral structure or a separate structure, made of metallic or plastic materials.

The tail end of the hook base 1 is disposed with a connecting head 17. The connecting head 17 and the hook base 1 are formed in an integral structure. A swivel connecting loop 7 is connected to the connecting head 17. The connecting loop 7 is locked on the connecting head 17 through a clamping ring.

Although the invention has been explained in relation to its preferred embodiment, it is to be understood that many other possible modifications and variations can be made without departing from the spirit and scope of the invention as hereinafter claimed.

The invention claimed is:

1. A self-locking hook to avoid unexpected release and opening, including a hook base and a lock hook, the lock hook is assembled with the hook base to form a relatively rotational structure through a rotation shaft; a head part of the hook base is provided with an opening, a hook arm is formed on one side of the opening, a mounting slot is located in the hook base, a ┌ shaped transverse clipping position defined by a curved slide rail disposed on both sides inside the mounting slot; the lock hook is an L-shaped bending structure, comprising a lock arm and a support arm, the support arm is embedded in the mounting slot of the hook base, the lock arm protrudes out toward the opening of the hook base, wherein the L-shaped bending structure also includes a press-button and an elastic arm, the front end of the press-button is extended with a pressing arm, the pressing arm is located inside the mounting slot, the press-button extends out of the hook base from a rear slot on the rear end of the mounting slot; an insertion hole matching the pressing arm and extending inward is configured along the rear end of the support arm, a spring is disposed inside the insertion hole, the spring is pressed upon the front end of the pressing arm, when the press-button is pressed down, the spring is compressed, and the pressing arm and an axle pin are completely inserted into the insertion hole, at this point, the axle pin leaves the transverse clipping position and forms an openable state with the support arm, in which they can rotate along the curved slide rail in the mounting slot; the elastic arm is mounted inside the mounting slot and pressed upon the bottom surface of the support arm to push the lock hook to maintain the locked state between the lock arm and the hook arm.

2. The self-locking hook to avoid unexpected release and opening defined in claim 1, wherein the axle pin is disposed on both sides of said pressing arm, and a long opening structure matching the axle pin is disposed on both sides of the insertion hole, the axle pin is stuck in the long opening structure, and wherein the axle pin protrudes on both sides of the pressing arm forming a clip structure that can be opened by the two-stage action of "pressing" and "rotation", so that when the press-button is released, the lock hook bounces back automatically, and the axle pin springs back to the transverse clipping position, implementing the self-locking function.

3. The self-locking hook to avoid unexpected release and opening defined in claim 1, wherein the entire lock hook is an L-shaped structure, the bent part of the lock hook is disposed with a shaft hole, a rotation shaft is put through the shaft hole and connected to the fixing hole on the hook base.

4. The self-locking hook to avoid unexpected release and opening defined in claim 1, wherein said elastic arm is connected to a decor cap, the decor cap is embedded in the slot mouth on the front end of the mounting slot to cover the mounting slot from the front end, and the elastic arm extends upward in an arched form from the lower side of the support arm to press upon the bottom surface of the support arm; or the elastic arm can be replaced by a metal reed or a spring to provide the source of elastic force against the support arm.

5. The self-locking hook to avoid unexpected release and opening defined in claim 4, wherein a positioning hole is disposed on the hook base at a position close to the front edge, and a clip is disposed on both sides of the decor cap, by locking the clip inside the positioning hole, the decor cap and the hook base are assembled and fixed together.

6. The self-locking hook to avoid unexpected release and opening defined in claim 1, wherein the head part of the hook arm is disposed with a hook head, the head part of the hook head is disposed with a lock head, the lock head and the hook head form an inverted T-shaped structure;

the end part of the lock arm is disposed with a lock groove in a shape to match the hook head and the lock head, when the lock arm and the hook arm are engaged, the hook head and the lock head are caught inside the lock groove, forming a closed force-bearing structure with the hook arm, which can effectively share the stress on the hook arm, and provide the hook body with greater tensile force bearing capacity.

7. The self-locking hook to avoid unexpected release and opening defined in claim 1, wherein the hook base, the lock hook and the press-button can be made of metallic or plastic materials; the pressing arm and the press-button can be an integral or separate structure; the decor cap and the elastic arm are an integral structure, and a separate structure of decor cap and elastic arm can be used as required, which is made of metallic or plastic materials.

8. The self-locking hook to avoid unexpected release and opening defined in claim 1, wherein the tail end of the hook base is disposed with a connecting head, the connecting head and the hook base are formed in an integral structure, a swivel connecting loop is connected to the connecting head, and the connecting loop is locked on the connecting head through a clamping ring.

* * * * *